US011134026B2

(12) United States Patent
McCormick

(10) Patent No.: US 11,134,026 B2
(45) Date of Patent: Sep. 28, 2021

(54) SELF-CONFIGURATION OF SERVERS AND SERVICES IN A DATACENTER

(71) Applicant: William Carson McCormick, Ottawa (CA)

(72) Inventor: William Carson McCormick, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 16/145,677

(22) Filed: Sep. 28, 2018

(65) Prior Publication Data

US 2019/0372909 A1    Dec. 5, 2019

Related U.S. Application Data

(60) Provisional application No. 62/679,318, filed on Jun. 1, 2018.

(51) Int. Cl.
*H04L 12/911* (2013.01)
*H04L 12/24* (2006.01)
*G06Q 30/08* (2012.01)

(52) U.S. Cl.
CPC .......... *H04L 47/781* (2013.01); *G06Q 30/08* (2013.01); *H04L 41/5029* (2013.01); *H04L 47/748* (2013.01); *H04L 47/788* (2013.01)

(58) Field of Classification Search
CPC ... G06Q 30/08; H04L 41/5029; H04L 47/748; H04L 47/788

(Continued)

(56) References Cited

U.S. PATENT DOCUMENTS 6,968,323 B1 * 11/2005 Bansal ................ G06Q 10/06 705/80
2003/0187970 A1 * 10/2003 Chase ................ G06Q 10/06 709/223

(Continued)

FOREIGN PATENT DOCUMENTS

| CN | 107852609 A | 3/2018 | |
|---|---|---|---|
| WO | WO-2011066807 A1 * | 6/2011 | ............. H04L 12/14 |
| WO | 2018201856 A1 | 11/2018 | |

OTHER PUBLICATIONS

Lin, Wei-Yu, Guan-Yu Lin, and Hung-Yu Wei. "Dynamic auction mechanism for cloud resource allocation." In 2010 10th IEEE/ACM International Conference on Cluster, Cloud and Grid Computing, pp. 591-592. IEEE, 2010. (Year: 2010).*

(Continued)

*Primary Examiner* — Suraj M Joshi
*Assistant Examiner* — Melaku Y Habtemariam

(57) ABSTRACT

A method and apparatus for allocating server resources to services are provided. Multiple services compete for resources on one or more servers and bid for resources. Servers assign resources based on bids according to an auctioning rule mechanism. Services update bids according to a probabilistic dynamic that can approximate a continuous-time Markov chain, both for each service and for the collection of services. The method and apparatus can involve multiple separate but interacting agents, and can be implemented for example for self-organization of a datacentre. The behaviours of the agents can be configured so that the collective behaviour results in a proportional fair resource allocation.

19 Claims, 13 Drawing Sheets

(58) Field of Classification Search
USPC .......................................... 709/224–226, 217
See application file for complete search history.

(56) References Cited

U.S. PATENT DOCUMENTS

| | | | |
|---|---|---|---|
| 2007/0011052 A1* | 1/2007 | Liu ...................... | G06Q 20/201 |
| | | | 705/20 |
| 2010/0248769 A1* | 9/2010 | Li ........................ | H04L 5/0062 |
| | | | 455/509 |
| 2016/0072704 A1 | 3/2016 | Angel et al. | |
| 2016/0205675 A1* | 7/2016 | Zhang ................. | H04W 72/044 |
| | | | 455/450 |
| 2016/0381146 A1 | 12/2016 | Zhang et al. | |
| 2018/0145923 A1 | 5/2018 | Chen et al. | |

OTHER PUBLICATIONS

"Markov Approximation for Combinatorial Network Optimization", IEEE Transactions on Information Theory, vol. 59, No. 101, Oct. 2013.
"Network Resource Allocation and a Congestion Game: The Single Link Case," R. Johari, J. Tsitsiklis, Proceedings of the 42nd IEEE Conference on Decision and Control, Dec. 2003.

\* cited by examiner

| State | Service1 spend on Server A | Service1 spend on Server B | Service2 spend on Server A | Service2 spend on Server B | Service1 Resources | Service2 Resources | Numerator | Prob |
|---|---|---|---|---|---|---|---|---|
| 0101 | 0 | 1 | 0 | 1 | 1 | 1 | 1 | 4.97408E-06 |
| 0102 | 0 | 1 | 0 | 2 | 0.666666667 | 1.33333333 | 0.38974434 | 1.93862E-06 |
| 0110 | 0 | 1 | 1 | 0 | 1 | 1 | 1 | 4.97408E-06 |
| 0111 | 0 | 1 | 1 | 1 | 1 | 2 | 256 | 0.001273363 |
| 0120 | 0 | 1 | 2 | 0 | 1 | 2 | 256 | 0.001273363 |
| 0201 | 0 | 2 | 0 | 1 | 1.33333333 | 0.66666667 | 0.38974434 | 1.93862E-06 |
| 0202 | 0 | 2 | 0 | 2 | 2 | 1 | 1 | 4.97408E-06 |
| 0210 | 0 | 2 | 1 | 0 | 2 | 1 | 1 | 4.97408E-06 |
| 0211 | 0 | 2 | 1 | 1 | 1.33333333 | 1.66666667 | 594.702672 | 0.002958096 |
| 0220 | 0 | 2 | 2 | 0 | 2 | 2 | 65536 | 0.325981036 |
| 1001 | 1 | 0 | 0 | 1 | 1 | 1 | 1 | 4.97408E-06 |
| 1002 | 1 | 0 | 0 | 2 | 1 | 2 | 256 | 0.001273363 |
| 1010 | 1 | 0 | 1 | 0 | 1 | 1 | 1 | 4.97408E-06 |
| 1011 | 1 | 0 | 1 | 1 | 1 | 2 | 256 | 0.001273363 |
| 1020 | 1 | 0 | 2 | 0 | 0.66666667 | 1.33333333 | 0.38974434 | 1.93862E-06 |
| 1101 | 1 | 1 | 0 | 1 | 2 | 1 | 256 | 0.001273363 |
| 1102 | 1 | 1 | 0 | 2 | 1.66666667 | 1.33333333 | 594.702672 | 0.002958096 |
| 1110 | 1 | 1 | 1 | 0 | 2 | 1 | 256 | 0.001273363 |
| 1111 | 1 | 1 | 1 | 1 | 2 | 2 | 65536 | 0.325981036 |
| 1120 | 1 | 1 | 2 | 0 | 1.66666667 | 1.33333333 | 594.702672 | 0.002958096 |
| 2001 | 2 | 0 | 0 | 1 | 2 | 1 | 256 | 0.001273363 |
| 2002 | 2 | 0 | 0 | 2 | 2 | 2 | 65536 | 0.325981036 |
| 2010 | 2 | 0 | 1 | 0 | 1.33333333 | 0.66666667 | 0.38974434 | 1.93862E-06 |
| 2011 | 2 | 0 | 1 | 1 | 1.33333333 | 1.66666667 | 594.702672 | 0.002958096 |
| 2020 | 2 | 0 | 2 | 0 | 1 | 1 | 1 | 4.97408E-06 |

Figure 11

SELF-CONFIGURATION OF SERVERS AND SERVICES IN A DATACENTER

CROSS-REFERENCE TO RELATED APPLICATIONS

This patent application claims priority to U.S. Patent Application No. 62/679,318, filed on Jun. 1, 2018 and entitled "Self-Configuration of Servers and Services in a Datacenter," which is hereby incorporated by reference herein as if reproduced in its entirety.

FIELD OF THE INVENTION

The present invention pertains to the field of data center configuration and in particular to a method and apparatus for configuring data center servers to provide particular services.

BACKGROUND

Data centers are facilities housing computer system components such as but not necessarily limited to computer servers. The computer servers can in turn be used to host multiple services. While some services can be hosted entirely on a single server, it is also possible to spread the hosting of a service across multiple servers. This can also be desirable for example for server redundancy purposes.

For large scale systems involving a large number of servers, services, or both, pairing servers with services can become complex. This complexity can become a problem particularly when service requirements vary over time, new services arise and existing services cease. It should be understood that different services may require different resource allocations, and that different servers may be able to provide different available allocations of resources to services. As services are started and stopped, available resource allocations on servers may become somewhat fragmented, and inefficiently spread. Inefficient placement of services may leave some server resources unused while requiring new servers to be added to the available pool of resources. This can lead to operating cost increases that must be passed along to users of the resources as well as inefficient consumption of power.

Therefore there is a need for a method and apparatus of selecting servers to host services that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method, apparatus and system for selecting server resources to host one or more services. Services may also be referred to as applications. The server resources can be located in at least one and possibly in a plurality of data centres. Selecting a server resource to host a service can be accompanied by hosting, or preparing to host, part or all of the service on the server resource. Embodiments of the present invention are configured to cause self-organization of data centres by automatically and dynamically associating server resources with services in a particular manner. In various embodiments, the resulting self-organization can be considered to have desirable performance according to certain metrics, such as a proportional fairness metric.

The provided methods, apparatus and systems can be implemented using one or more computing devices, each of which manages resource allocation-related decisions for one or more services, one or more servers, or a combination thereof. Each service can be supported by a service agent that manages spend or bid decisions for that service. Bids are used by services to procure server resources. Each server can also be supported by a server agent that manages resource allocation decisions for that server, in response to received spend or bid decisions from services. Service agents, server agents, or both, can be physically or functionally separated, or partially or fully integrated together. The agents can be provided via software configuration of computing devices, for example. Plural networked computing devices, agents, or both, can interact with each other to implement the method, apparatus, or system. Some or all of the computing devices, agents, or both, can be hosted within the same data centre. The computing devices, or the agents operating thereon, operate based on a predetermined set of rules in order to allocate server resources for the hosting of services.

In accordance with an aspect of the present invention, there is provided a method for associating server resources with a service, the method being performed by a computer system for managing the service. The method generally includes repeatedly: updating a spend allocation according to a probabilistic transition dynamic; communicating one or more changes in bid amounts to corresponding ones of one or more servers in response to the updating of the spend allocation; receiving feedback, from the one or more servers; and controlling the probabilistic transition dynamic based on the feedback. The spend allocation of service the (indexed as service i) includes one or more bid amounts $s_{ij}$, each representing a bid for resources on a corresponding one (indexed as server j) of the one or more servers. The feedback is indicative of amounts $b_{ij}$ of resources allocated by each respective one j of the one or more servers, said amounts $b_{ij}$ of resources allocated for hosting the service i in response to the spend allocation $s_{ij}$. Spend allocations of the service are also referred to herein as states of the service. The feedback, as an alternate, may be indicative of resource prices used by each respective one of j of the one or more servers in allocating said amount of $b_{ij}$ of resources.

In various embodiments, the probabilistic transition dynamic comprises probabilistically (e.g. with a random component) transitioning the spend allocation from a current spend allocation to a different spend allocation according to a particular transition rate, also referred to simply as a rate. The transition rate from the current spend allocation to the different spend allocation can be determined via calculation. In particular, the calculation includes determining a transition rate satisfying the condition that: the ratio between: the transition rate from the current spend allocation to the different spend allocation; and the transition rate from the different spend allocation to the current spend allocation has a value given by a particular function described as follows. It should be understood that the random component may be a pseudo-random component. Furthermore, the determination of the transition rate may be performed through the use of numerical computation by a processor such as a computer processor.

In some embodiments, the function is given by a particular term raised to a predetermined power. The numerator of the term corresponds to a total anticipated amount, over all of the one or more servers, of resources allocated for hosting the service i in response to the different spend allocation. The denominator of the term corresponds to a total amount, over all of the one or more servers, of resources allocated for hosting the service i in response to the current spend allocation. The total amount of resources allocated for hosting the service may be an estimated value.

In other embodiments, the function is given by multiplying together a plurality of values each consisting of a respective term raised to a respective power. The numerator of each term corresponds to a total anticipated amount, over all of the one or more servers, of resources allocated for hosting a different particular one i of a plurality of services in response to the different spend allocation. The denominator of this term corresponds to a total amount, over all of the one or more servers, of resources allocated for hosting this different particular one i of a plurality of services in response to the current spend allocation. The total amount of resources allocated for hosting the service may be an estimated value.

Although only one "different" spend allocation is explicitly discussed above, it is noted that controlling the spend allocation may include probabilistically transitioning to one of a plurality of different spend allocations according to a corresponding rate, each rate being as described above. From a given spend allocation, it may be possible to transition to any one of a set of one or more different spend allocations. Once a transition to a different spend allocation is triggered, the process repeats. Those skilled in the art will appreciate that the repeating of the process can proceed with the newly transitioned-to spend allocation becoming the new (current) spend allocation.

Determining the transition rates can comprise computationally solving a plurality of interdependent equations each being as described above.

The probabilistic transition dynamic can correspond substantially or approximately to that of a continuous-time Markov chain, in which the state (i.e. spend allocation) transitions occur randomly according to specified rates. Conceptually, given the current state of a service agent, it is possible to transition into one of a set of one or more potential new states. Prospective times until the service agent transitions to each one of these potential new states are given by an exponential probability distribution with a particular rate parameter. The potential new state corresponding to the shortest one of these times is selected as the new state of the Markov chain, and the state transition occurs at this shortest one of the times. The rate parameters can be generated so that they conform to the conditions specified above and elsewhere herein. The times can be generated by computation, pseudo-random number generation, or look-up table, for example. State transitions can be performed by computation by the service agent. In practice, Poisson splitting and/or combining may be used to implement the probabilistic transitions based on generation of transition times according to an exponential probability distribution, and weighted random selection of a new state at the generated transition time.

In accordance with another aspect of the present invention, there is provided a method for associating server resources with a plurality of services. This method includes performing, on behalf of each of the plurality of services, the above-described method for associating server resources with that service. In some embodiments, the different instances of the above described method are performed in parallel. The different instances of the method can be performed substantially independently, which facilitates a decentralized solution. However, because the feedback from the servers is based on a combination of bids on behalf of different services, it should be noted that the behaviour of the different instances of the method (e.g. their transition rates) are ultimately coupled together through the servers' feedback.

In accordance with another embodiment of the present invention, there is provided an apparatus configured to perform operations in accordance with the above-described method. The apparatus can be a networked computing device or a computing device configured to implement one or more service agents thereon. Accordingly, embodiments of the present invention provide for an apparatus for obtaining server resources for supporting a service i. The apparatus includes a computer processor operatively coupled to memory. The apparatus is configured to repeatedly: update a spend allocation according to a probabilistic transition dynamic, the spend allocation comprising one or more bid amounts $s_{ij}$, each representing a bid for resources on a corresponding one j of one or more servers; communicate one or more changes in the one or more bid amounts $s_{ij}$ to corresponding ones of the one or more servers in response to the updating of the spend allocation; receive feedback, from the one or more servers, indicative of amounts $b_{ij}$ of resources allocated by each respective one j of the one or more servers, said amounts $b_{ij}$ of resources allocated for hosting the service i in response to the spend allocation $s_{ij}$; and control the probabilistic transition dynamic based on the feedback from the one or more servers.

In accordance with another embodiment of the present invention, there is provided a system comprising a plurality of apparatuses as described above, where each apparatus implements operations of one or possibly a plurality of service agents thereon.

In various embodiments of the present invention, computing devices or managing agents manage server resource allocations, made in response to service spend allocations, using a predetermined auction type process. These computing devices, or server agents, can be included in an apparatus or system as described herein. Similarly, actions performed according to one or more such computing devices or server agents can be included in one or more methods as described herein.

BRIEF DESCRIPTION OF THE FIGURES

Further features and advantages of the present invention will become apparent from the following detailed description, taken in combination with the appended drawings, in which:

FIG. 11 illustrates the equilibrium, steady-state probabilities for the Markov chain according to an instance of the example embodiment of FIG. 10.

It will be noted that throughout the appended drawings, like features are identified by like reference numerals.

DETAILED DESCRIPTION

Figure 1:
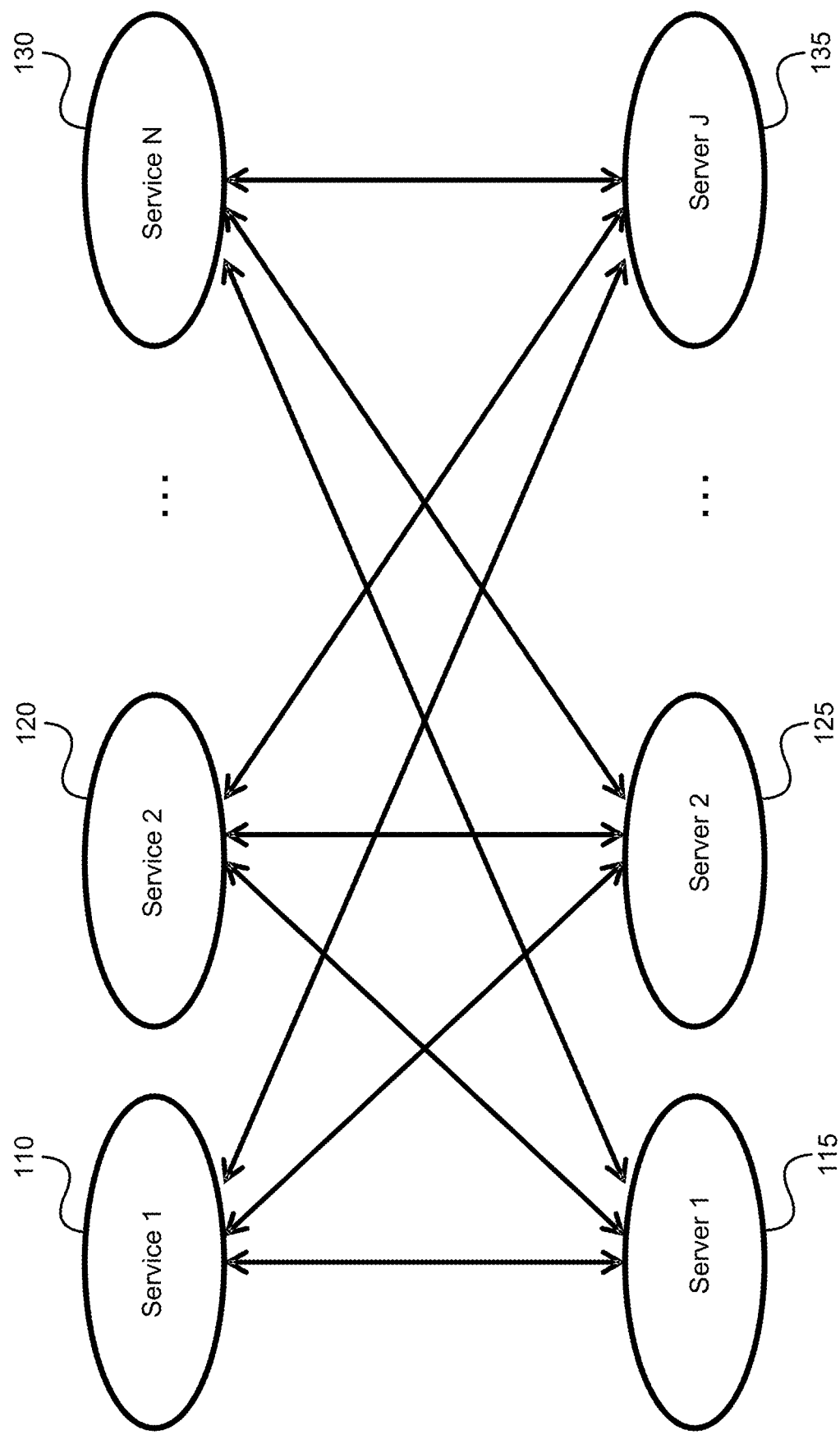
FIG. 1 illustrates a graph showing a plurality of service agents interacting with a plurality of servers (or server agents), according to an embodiment of the present invention.

Embodiments of the present invention provide for a method and apparatus for facilitating self-organization of a data centre. Servers may be either (or both) physical servers within (or available to) a data center or virtual server entities instantiated upon the data center resources. Servers of the data centre make their resources available at a price, which can be adjusted according to an auctioning process. Service agents operate on behalf of services to select one or more servers upon which the service will be instantiated and run. The service agents have a budget and pay (either nominally or actually) for server resources according to current prices. The servers then provide resource allocations to the services that have successfully bid for the resources. A service can be hosted on one or a plurality of servers, for example with different parts hosted on different servers or with multiple servers providing redundancy. Thus, self organization occurs by automatically configuring servers to host services that have successfully bid for their resources. It is noted that the service and server behaviour as described herein can be implemented at a single data centre, or across multiple data centres, or across a plurality of resources which are not necessarily housed in physical data centres.

A service can refer to a customer facing application, or an internal supporting application. Services include but are not necessarily limited to web applications, media streaming services, videoconferencing services, data caching services, virtualized services of a core network such as a 5G network, cloud-based services, and edge computing applications. Services may be instantiated dynamically and may adjust their requirements over time, for example based on current customer demand. Service agents are computers or functional aspects thereof which perform at least the resource allocation related operations on behalf of services, as described herein. Service agents may be hosted on computing resources of a data centre. Plural service agents may be hosted on the same computing resource, or on separate computing resources.

A server can refer to a computer server or virtual computer server housed in a location such as a data centre. A server can refer to a collection of resources, such as processing, communication, or memory resources, or a combination thereof. A server may include at least a set of one or more computer processor's operatively coupled to memory, and a network interface. The term "server" is also used to denote a server agent, which manages auction-based resource allocation.

Embodiments of the present invention provide for server resource allocations in a distributed manner, using a Markov approximation approach. The service agents and servers interact according to a predefined set of rules in a manner which can be modelled as a Markov chain. The Markov chain models a combinatorial optimization problem. The transition rates of the Markov chain can be configured so that the steady-state probability distribution of the chain has its probability mass primarily on those states which approximately solve the optimization problem. For example, once the services collectively reach a state which approximately optimizes the resource allocation problem, the transition rate out of the state may be relatively low. Notably, the resource allocation problem can be treated as a combinatorial optimization problem rather than a mixed integer/convex optimization problem. This allows for the Markov approximation technique to be more readily applied. In some embodiments, the service agents will spend the majority of the time in those states which approximately solve the optimization problem.

Embodiments of the present invention provide for a method, apparatus and system comprising one or more servers configured to allocate resources according to an auction process, and one or more service agents configured to bid for server resources according to a randomized process. The randomized process follows the Markov property, in that bid probabilities depend on the service's current resource allocation, as well as the collective effects of the current resource allocations of all services on the servers' resource prices. The servers' resource prices can be computed in a memoryless fashion (i.e. based on current bids only rather than bid history). The service agent and server behaviours can be configured so that the resulting system behaviour corresponds to a Markov chain which has a steady-state probability distribution that corresponds approximately to an optimal or near-optimal resource allocation. Thus, server resource allocations are selected (by the services or the corresponding service agent) using Markov approximation methods. The server and service agent behaviours may be selected so that a proportional fair resource allocation, among services, is approximately achieved.

In various embodiments, the Markov approximation is distributed so that each service agent acts substantially independently. In various embodiments, service agents estimate server resource prices based on a server reserve price. Service agents may additionally estimate server resource prices based on information received from each server. Service agents may additionally estimate the impact of their resource bids on server resource prices.

Service Behaviour

As outlined above, service agents can be configured to bid for server resources in a dynamic and probabilistic manner. As a precondition for being able to be hosted by a set of servers, services may be associated with service agents which follow the behaviours set forth herein. For example, a service may be wrapped in an outer layer which implements the service agent. As another example, a set of specifications, or a published application programming interface (API) may be provided specifying how the service is to be configured in order to implement such a service agent. Compliance checks may be performed to ensure service agents are acting as prescribed. Alternatively, other server or service agents can be configured to detect and penalize non-compliant agents.

Each service can have a particular set of resource requirements. The resource requirements can be unchanging or changing over time, for example in response to customer demands. In a simple implementation, resource requirements can correspond to a number of units of server resources. Each unit of server resources can represent a predetermined amount of processing resources, random access memory, mass storage memory space, or a combination thereof, for example. In this case, the current resource requirement for each service can be given by a single value. However, it is recognized that in more complex implementations, server resources can be differentiated by type (e.g. processing resource, memory resource, network resource, etc.), by performance (e.g. latency, QoS, uptime duty cycle, etc.), or a combination thereof. In this case, the current resource requirement for each service can be given by a plurality (e.g. vector) of values, or associated with a more complex resource requirement function. For example, the resource requirement function can be vector-valued or a weighted combination of different requirements.

The service agent determines or is provided with a budget amount $S_i$ which is associated with the service. The budget amount may be set based on the resource requirements of the service, or in another manner. The budget amount may be fixed or may change over time. The budget amount represents the maximum sum total amount of bidding units that the service agent is able to use at a time to bid for server resources. Optionally, each bidding unit represents a provisional or non-provisional payment commitment in a monetary contract. It should be understood that different service agents (each associated with different services) can have different budget amounts.

FIG. 1 illustrates a graph showing a plurality of service agents 110, 120, 130 interacting with a plurality of servers (or server agents) 115, 125, 135, according to an embodiment of the present invention. For simplicity, service agents are also referred to as services. The graph is a bipartite graph in the sense that services interact directly with servers but not necessarily with other services, while servers interact directly with services but not necessarily with other servers. Interaction can be performed by message passing, either internally within a computing device or over a network, as required.

The interaction between a given service i 210 and a given server j 220 is described as follows, with respect to FIG. 2, which shows a selected portion of FIG. 1. The interaction in FIG. 2 may be generic to all the illustrated services and servers of FIG. 1. It is noted that a service might only interact with one or a limited number of servers at a time, a service does not necessarily interact with every server, and further a service might refrain from interacting with any servers for a significant but typically finite period of time.

Figure 2:
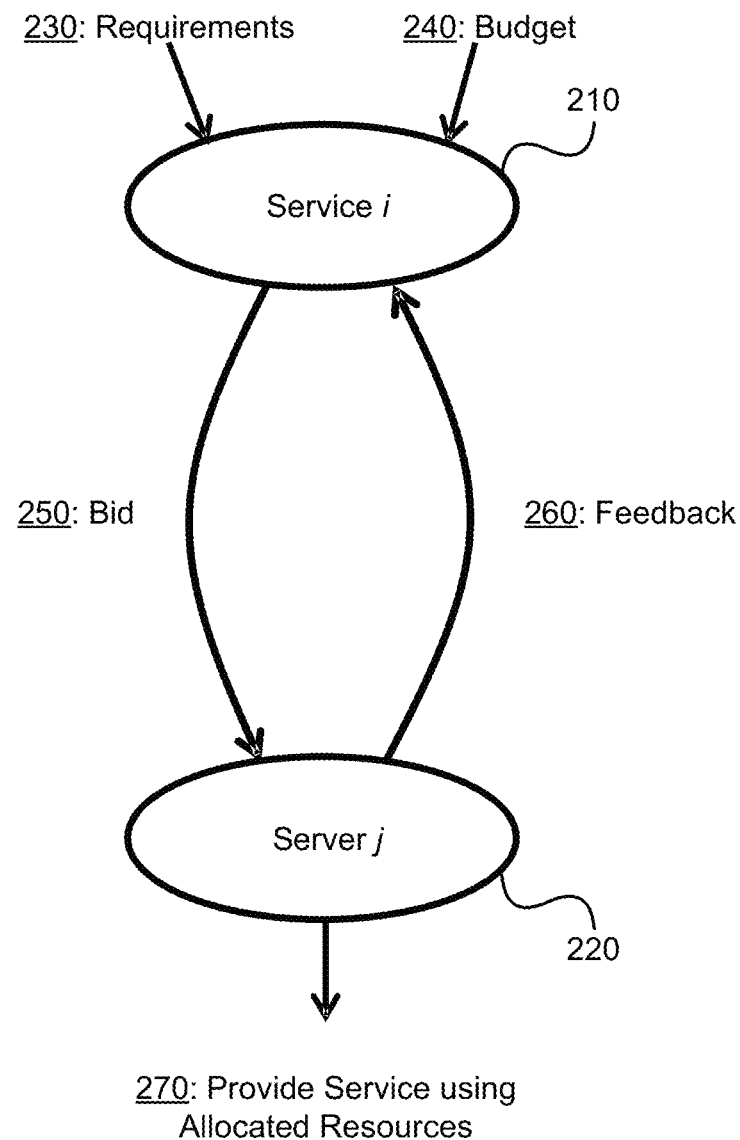
FIG. 2 illustrates a service agent interacting with a server, according to an embodiment of the present invention.

In more detail, with respect to FIG. 2, the service i, in view of a set of service requirements 230 and a budget amount $S_i$ 240, determines a spend allocation which includes bid amounts for resources on one or more servers, including the server j. The bid amount of service i for server j is denoted as $s_{ij}$. Bids may be considered to be selected from a discrete set, thus supporting a combinatorial optimization approach. A sum of all the bid amounts submitted at a time by service i is constrained to be less than or equal to the budget amount $S_i$. Other constraints may also be present, for example a constraint that at least one bid amount must be greater than zero, or a constraint that at least a predetermined number (greater than one) of bid amounts must be greater than zero, or a constraint that at most another predetermined number (greater than one) of bid amounts must be greater than zero. This results in a service using at least a certain minimum number, or at most a certain maximum number (or both) of servers at a time.

If the bid amount $s_{ij}$ for server j has changed relative to the previous bid amount for the server, then service i communicates this new bid amount 250 to server j. If the bid amount has not changed, then the communication is not necessarily performed. In response the communication, and if the bid amount $s_{ij}$ has changed and is nonzero (and in some embodiments, adequately high), the server j adjusts the amount of resources allocated for supporting the service i. The server subsequently uses this amount of resources to provide 270 the service. This may include configuring these resources to carry out computing, storage, communication operations, or a combination thereof, in support of the service. The amount of resources allocated by the server in support of the service is determined through a competitive auctioning dynamic which is described elsewhere herein. It is noted that the server j can also adjust the amount of resources allocated for supporting the service i in response to other events, such as but not limited to changes in bid amounts by other services being served by the server j.

At certain times, for example in response to receiving and processing a bid-related communication from the service i, in response to changes to the amount of resources allocated by the server in support of the service i, or periodically according to the schedule, the server j may communicate feedback 260 to the service i. The feedback may be indicative of the amount of resources that the server j has allocated in support of the service i. The feedback may additionally or alternatively be indicative of the per-resource price set by server j. (It is noted that the resource allocation can, in some embodiments, be at least approximately determined from the current bid and per-resource price.) The service i uses this feedback to update (if necessary) its probabilistic transition dynamics for controlling updates to its spend allocation.

Figure 3:
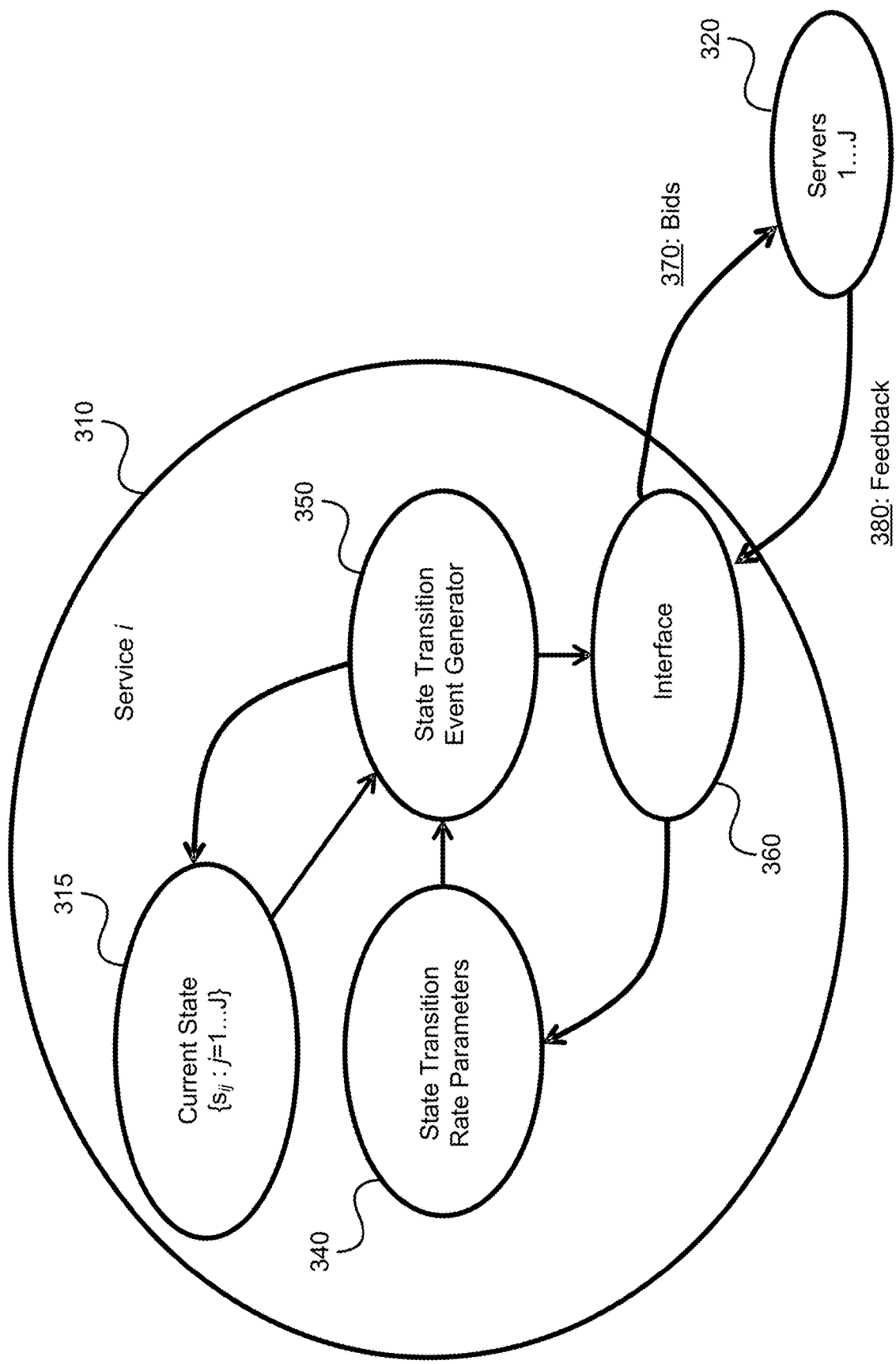
FIG. 3 illustrates operation and functional components of a service, according to an embodiment of the present invention.

FIG. 3 illustrates operation and functional components of the service i 310 in more detail, according to an illustrative embodiment of the present invention. FIG. 3 also illustrates the existence of communication between the service i and one or potentially multiple servers 320. This communication involves bidding 370 and feedback 380 as described above with respect to FIG. 2. The communication can be performed via an interface 360, such as a network interface, as shown. According to FIG. 3, the service tracks a current state 315, which is a current spend allocation comprising one or more bid amounts $s_{ij}$. Each bid amount represents a current bid for resources on a corresponding one j of one or more servers. Given the current state, a state transition event generator 350 operates to determine the timing of a transition to a new state, and which new state is being transitioned to. When a state transition occurs, the state transition event generator updates the current state to be equal to the new state.

The state transition event generator operates according to a probabilistic transition dynamic. The following discussion outlines the probabilistic transition dynamic in terms of a continuous time Markov chain. However, it should be readily appreciated that other probabilistic transition dynamics, such as but not limited to a discrete time Markov chain approximation of the continuous time Markov chain, can also be implemented. State transitions, also known as bid change events, may be generated approximately according to a Poisson process (i.e. with event inter-arrival times having an exponential distribution). In general, a probabilistic transition dynamic incorporates a random or pseudo-random element, such that state transitions are (effectively) based partially on random chance. According to embodiments of the present invention, a probabilistic transition dynamic may follow the Markov property, such that the state transition probabilities or rates depend on the current state but are independent of past states.

Given the current state, the state transition event generator determines all the possible next states of the spend allocation. In various embodiments, the possible (i.e. allowable) next states are limited by one or a combination of constraints. For example, as mentioned above, one constraint may be that possible next states are limited to those for which the sum of all the bid amounts is less than or equal to the budget amount $S_i$. Another constraint, as mentioned above, may be that possible next states are limited to those for which at least a predetermined number (greater than or equal one) of bid amounts are greater than zero. Another constraint, as mentioned above, may be that possible next states are limited to those for which at most a predetermined number of bid amounts are greater than zero. Another constraint may be that possible next states are limited to those which differ from the current state only in up to a limited number of bid amounts. That is, the service can only change its bid at a limited number (e.g. one) of servers at a time. Another constraint may be that differences in bid amounts can only change by a limited amount (e.g. one unit). In one embodiment, the service can change its bid on one server at a time, by raising or lowering the bid by a predetermined fixed amount (e.g. one unit).

In some embodiments, one or more constraints can be relaxed under certain conditions, for example when the service's current spend is below its total budget by at least a predetermined threshold amount, or when the resources allocated to the service are currently below a target level by another predetermined threshold amount. The constraints can also be relaxed gradually in proportion to the difference between the service's current spend and its total budget, or in proportion to the difference between the service's current resource allocation and its target resource allocation level. For example, for a service with a currently low spend or resource allocation, the service may be allowed to change its bid amount on a server by more than one unit at a time. Similarly the service may be allowed to change its bid on more than one server at a time under such conditions. Such a relaxing of constraints may allow services to more quickly approach the optimal resource allocation.

In some embodiments, for each of the possible next states, the state transition event generator may generate a prospective transition time. These transition times, which may be viewed as time intervals, may be considered for purposes of analysis to be random, and may indeed be generated in a random or pseudo-random manner in various embodiments. The shortest one of these prospective transition times is selected as the time at which the state transition event generator will trigger updating of the current state. The new state is selected as the state corresponding to this shortest one of the transition times. It should be noted that in practical implementations it may not be necessary to generate multiple prospective transition times and select the shortest one therefrom. Rather, a different computational process which results in a mathematically equivalent transition time (or transition rate) generation and corresponding state selection can be performed, as would be readily understood by a person skilled in the art.

In some embodiments, Poisson process splitting or combining techniques can be used to generate state transition events at the appropriate rate. This can also provide for only one state transition event to be generated at a time. For example, rather than independently randomly generating multiple prospective transition times according to multiple different exponential distributions, a single transition time can be generated from an aggregate exponential distribution having an rate parameter equal to the sum of the rate parameters for the multiple different exponential distributions. The state transition can occur at the time given by the aggregate exponential distribution, and the state to which the transition occurs can be selected randomly. For a given state b, the appropriate probability for selecting state b is $\lambda_b/\lambda$, where $\lambda_b$ is the rate parameter for transitioning to state b, and $\lambda$ is the rate parameter of the aggregate exponential distribution. Poisson process splitting and combining may additionally or alternatively be used to generate state transition events for groups of multiple services. For example, multiple services can coordinate to initiate state transitions at different times, thereby avoiding situations in which many services attempt to change their bids at once. Poisson splitting and combining will be readily understood by the skilled person.

In some embodiments, given a current state a, for each possible new state b, the transition rate from state a to state b (denoted $q_{ab}$) is specified as follows. Define $q_{ba}$ as the transition rate from state b to state a. The transition rate satisfies a ratio condition given according to either:

$$\frac{q_{ab}}{q_{ba}} = \left( \frac{\sum_{j=1}^{J} b'_{ij}}{\sum_{j=1}^{J} b_{ij}} \right)^{\beta S_i} ; \tag{1}$$

or alternatively $$\frac{q_{ab}}{q_{ba}} = \prod_{i=1}^{N} \left( \frac{\sum_{j=1}^{J} b'_{ij}}{\sum_{j=1}^{J} b_{ij}} \right)^{\beta S_i} . \tag{2}$$

In the above Equations (1) and (2), $\beta$ is an extrinsic or design parameter (e.g. equal to 4 in some embodiments), and the term $S_i$ can be replaced with a different term. The term $b_{ij}$ denotes the (possibly estimated) amount of resources allocated by server j to service i in response to the service i bidding according to the current state a. The term $b_{ij}'$ denotes the (possibly estimated) anticipated amount of resources that would be allocated by server j to service i in response to the service i bidding according to the new state b. While Equations (1) and (2) specify a ratio between transition rates, transition rates satisfying these ratios can be readily computed. Furthermore, transition rates between a plurality of states can be computed by solving a system of equations, each equation given according to Equation (1) or (2) and representing a different pair of states. Solving equations or systems of equations can be performed numerically by a computer. It is noted that the term $S_i$ in the exponent of Equations (1) or (2) can be replaced with a more general term $Z_i$, which can in some embodiments be equal to $S_i$.

In words, Equation (1) specifies that the ratio of transition rates $q_{ab}/q_{ba}$ can be evaluated using a function that includes a given term raised to the power of $\beta S_i$, where the given term is as follows. The numerator of the term corresponds to a total anticipated amount, over all of the one or more servers, of resources allocated for hosting the service i in response to the different spend allocation. The denominator of the term corresponds to a total amount, over all of the one or more servers, of resources allocated for hosting the service i in response to the current spend allocation. It should be understood that the term $\beta S_i$ may be more generally represented as $\beta Z_i$.

In words, Equation (2) specifies that the ratio between transition rates $q_{ab}/q_{ba}$, where state a is the current spend allocation and state b is a different spend allocation, can be evaluated using a function that is described as follows. The function is given by multiplying together a plurality of values. Each of the plurality of values is, respectively, a particular term raised to a corresponding power $\beta S_i$. The numerator of each term corresponds to a total anticipated amount, over all of the one or more servers, of resources allocated for hosting a different particular one i of a plurality of services in response to the different spend allocation. The denominator of this term corresponds to a total amount, over all of the one or more servers, of resources allocated for hosting this different particular one i of a plurality of services in response to the current spend allocation. It should be understood that the term $\beta S_i$ may be more generally represented as $\beta Z_i$.

The prospective transition time from current state a to each possible new state b is (conceptually or practically) computed according to an exponential probability distribution, where the exponential probability distributions have rate parameters satisfying one of the above two ratio conditions, given by Equations (1) and (2) respectively. The rate parameters of the exponential distributions essentially correspond to the transition rates of the service agent.

As also illustrated in FIG. 3, applicable state transition rates, or related data, may be tracked as state transition rate parameters 340 by the service and used to inform the state transition event generator. The state transition rate parameters may be updated based on feedback from the servers, received via the service's interface 360. The state transition rates may be estimates of the theoretically prescribed transition rates. For example, each server j may inform the service of the amount $b_{ij}$ of resources allocated by the server j to the service i in response to the current bid of service i. The server j may update this feedback information over time. In some embodiments, each server j may also inform the service of amounts of resources allocated by the server j to other competing services, for example in response to the current bids of those other services. The server j may additionally or alternatively inform the service of its current resource price. The information received from each server j is not necessarily perfectly up to date.

It is noted here that the total amount of resources assigned to service i is given by $b_i = \Sigma_{j=1}^{J} b_{ij}$.

As also illustrated in FIG. 3, the state transition event generator 350 informs the interface 360 of state transitions, either as they occur or in advance. The new state is distinguished from the previous state in that one or more bid amounts have changed. The interface is configured to inform the appropriate servers 320 of these bid amount changes, for example via messages transmitted over a communication network.

In various embodiments, the service state 315 is initialized such that at least one bid is nonzero. In various embodiments, different services are configured to update their states at different times, or the servers treat the updates from different services as occurring at different times.

Estimation of Transition Rate Parameters

It is noted that a service's transition rates depend on resource allocation parameters $b_{ij}$ and $b_{ij}'$. The values for these parameters are not necessarily known perfectly by the services. For example, the amount of resources allocated by a server j to a service i (or the per-unit resource price) may have changed due to the change in bid from another server, or due to an extrinsic event, such as a full or partial server outage. Furthermore, the resource allocation or price adjustment reaction of server j to a prospective future bid is not necessarily known perfectly.

Therefore, embodiments of the present invention comprise estimating the present value of such parameters $b_{ij}$ and $b_{ij}'$ (or the corresponding resource price), or even anticipating the future value of such parameters. In various embodiments, server resource allocations and bids are related through the server's current resource price as given in Equation (6), to be explained below. The server's resource price can further be given according to Equation (3) or (4), also to be explained below. Therefore, parameter estimation can involve estimating server resource prices and then deriving the desired parameters using the above equations. Each service may be configured to independently estimate the present and future values of parameter such as $b_{ij}$ and $b_{ij}'$ (or the corresponding resource price).

In some embodiments, a service i can estimate a server j's resource price the following rule. If the service is not currently utilizing any resources from the server, then the estimated resource price can be set equal to the server's minimum resource (reserve) price. Otherwise, the service can set the estimated resource price as the price it is currently paying for resources (e.g. according to the latest feedback received from the server). This price can be computed via Equation (6), given the most recent bid and feedback information. This may be referred to as "naïve" price estimation.

In some embodiments, servers can distribute their current resource prices to services on an ongoing basis, for example using broadcast messaging or a gossiping protocol. Services can use the most up to date information from servers as their price estimations. This may be referred to as "pricetaker" price estimation. It is noted that communicating resource prices requires a nonzero amount of time, so prices may no longer be accurate by the time they are received. In embodiments using a gossiping protocol, service agents in receipt of pricing information can forward this information to other service agents, either with or without processing.

In some embodiments, servers can distribute their current resource prices to all services and each service will estimate the effects of its prospective bids on the server resource price. This may be referred to as "anticipate" price estimation. This may be accomplished for example by building knowledge of the servers' resource allocation behaviours into each service agent. However this increases complexity of the system and makes it difficult to change server resource allocation behaviours.

In some embodiments, server resource prices are known perfectly by services, for example via extensive operative coupling of services and servers. This may be referred to as "perfect" price estimation. However, perfect price estimation may be difficult to realize in a distributed implementation.

It is also noted that a hybrid combining one or more of the above, or other price estimation methods, can be implemented by a service. Different services do not necessarily use the same price estimation routines.

Similarly, it is noted that, in various embodiments, each service i can only be expected to estimate the changes to its own parameter values $b_{ij}$ and $b_{ij}'$. Service i may therefore refrain from attempting to estimate the parameter values for other services operating concurrently with service i.

Server Behaviour

As described above, each server (server agent) receives bids from one or more services, allocates server resources according to an auction process based on the bids, and uses these allocated server resources to provide part or all of services to which the resources have been allocated. The auction process may be characterized as a Johari-Tsitsiklis auction, for example as described in "Network Resource Allocation and a Congestion Game: The Single Link Case," R. Johari, J. Tsitsiklis, Proceedings of the 42$^{nd}$ IEEE Conference on Decision and Control, 2003. The servers can update their resource allocations and subsequent service provisions in response to bid changes. The servers can also communicate resource allocation information (or pricing information) back to the service agents. A server assigns resources to services based on the bids made by all services on that server. Service behaviours are coupled through the resource assignment mechanisms of the servers.

In various embodiments, each server j allocates an amount $b_{ij}$ of services to be given service i (having placed a nonzero bid at server j) according to the following procedure. The server j has a set volume $r_j$ of resources that are allocable to services. As mentioned above, the resources can be processing, memory, communication, or other resources, or packaged and portioned combinations thereof. For purposes of clarity, it is assumed that a single type of resource is allocable. If multiple types of resources are allocable, the server can allocate each different type of resource separately in a similar manner.

In some embodiments, the server j sets the price for its resources according to:

$$p_j = \frac{\sum_{i=1}^{N} s_{ij}}{r_j}. \quad (3)$$

Here, $p_j$ is the resource price at server j, and $S_{ij}$ are the service bids as described previously.

In other embodiments, the server j sets prices for its resources according to:

$$p_j = \max\left\{\frac{\sum_{i=1}^{N} s_{ij}}{r_j}, \theta_j\right\}. \quad (4)$$

Here, $\theta_j$ is a predetermined minimum resource price for server j, also referred to as server j's reserve price.

It is noted that the server resource assignments are bounded above by the total available volume $r_j$ of resources, that is:

$$\sum_{i=1}^{N} b_{ij} \leq r_j \quad (5).$$

The server allocates resources according to:

$$b_{ij} = \frac{s_{ij}}{p_j}. \quad (6)$$

It is noted that the server may explicitly set resource prices, or alternatively the server may perform the resource pricing and allocation operations together, such that resource prices are not necessarily explicitly generated and stored.

Figure 4:
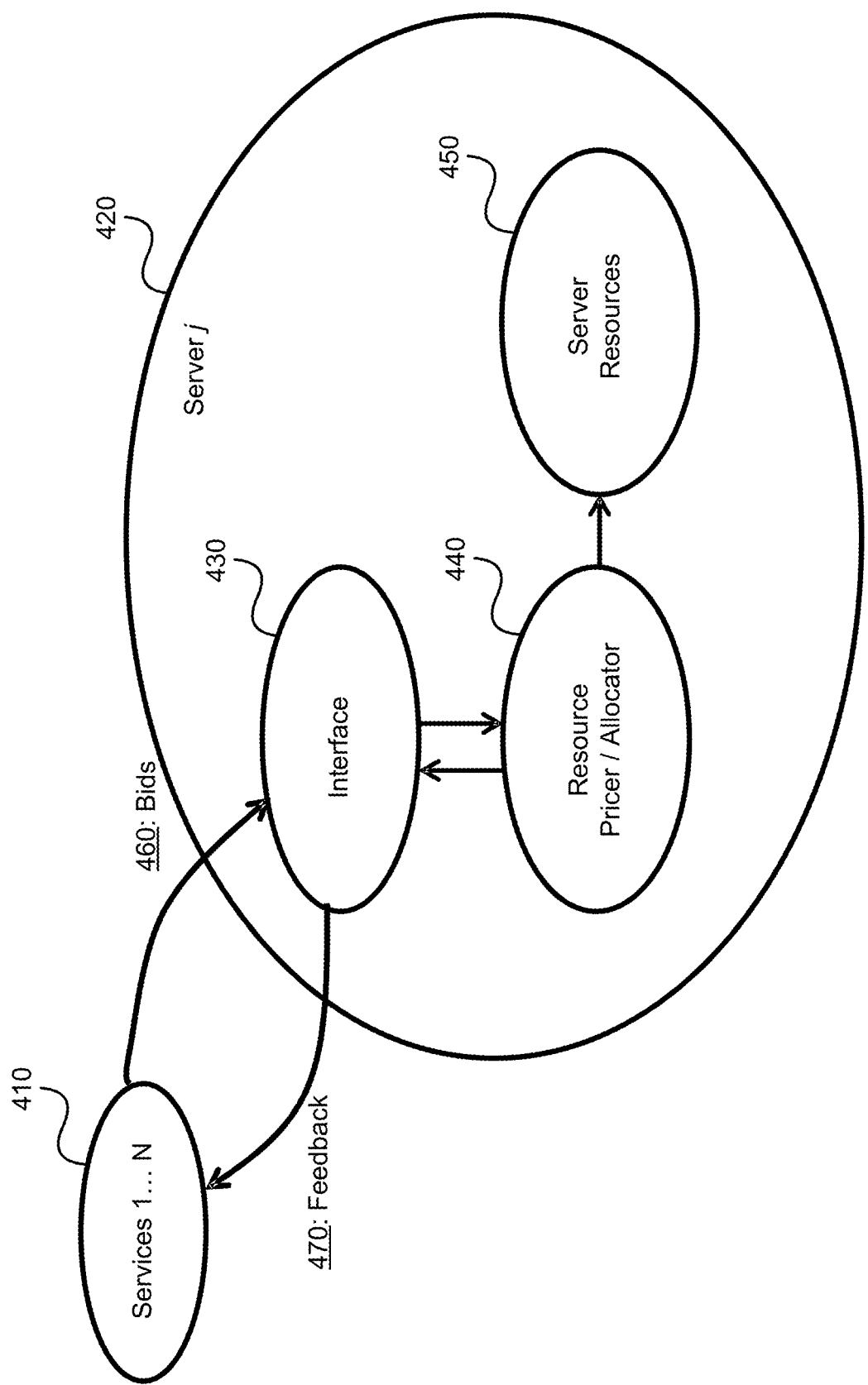
FIG. 4 illustrates operation and functional components of a server, according to an illustrative embodiment of the present invention.

FIG. 4 illustrates operation and functional components of the server j 420 in more detail, according to an illustrative embodiment of the present invention. FIG. 4 also illustrates the existence of communication between the server j and one or potentially multiple services 410. This communication involves receiving bids 460 from the services and providing feedback 470 to the services, as described above with respect to FIGS. 2 and 3. The communication is performed via an interface 430, such as a network interface, as shown in FIG. 4.

According to FIG. 4, the server includes a resource pricer or resource allocator 440 which allocates server resources 450 to services based on the bids from those services, received via the interface 430. Allocating of the server resources may include pricing of these resources. Pricing and allocation may be performed via computation by a computer processor executing instructions stored in a memory. The pricing and allocation behaviours of the server are as described above. When resource pricing is performed implicitly, component can be referred to simply as a resource allocator. The resource allocator manages a set of server resources 450 according to the current resource allocation. The server resources are managed by configuring one or more givens amount of the server resources so that they support one or more given services. The given amount of resources supporting a given service i corresponds to the allocated amount $b_{ij}$.

Configuration of server resources to support the service performed in a variety of ways. For example, a portion of the server's processing bandwidth can be set aside for use in performing computations according to computer program instructions dedicated to the service. A portion of the server's memory or communication bandwidth can similarly be set aside for providing the service. Server resources can be dedicated only for supporting a given service. Alternatively, the server can commit to providing a certain amount of its resources on average to supporting the service, and then manage prioritization of its internal resources among services accordingly. Certain (e.g. selected) server resources can be directed exclusively or non-exclusively toward supporting the given service.

The resource allocator may also be configured to provide information, such as current resource allocations, back to the server's interface for communication as feedback to the various services. As already mentioned above, each server j may inform, via its interface, one, some or all services of the amounts $b_{ij}$ of resources allocated by the server j to one or more services i in response to the currently received bids from the services. The server j may update this feedback information over time, for example periodically or in response to bid changes. In some embodiments, the server j may inform each service i of only its own resource allocations. In other embodiments, the server j may inform each service i of the resource allocations of multiple services, for example all services being served by the server j. Other relevant information, such as pricing information, may similarly be communicated by the server to the services. It is noted that resource allocation information and pricing information may be substantially equivalent from the perspective of a service agent, for example because, knowing its current bid, a service agent can calculate the current resource allocation from the current price or vice-versa via Equation (6).

Apparatus and Computer Implementation

Figure 5:
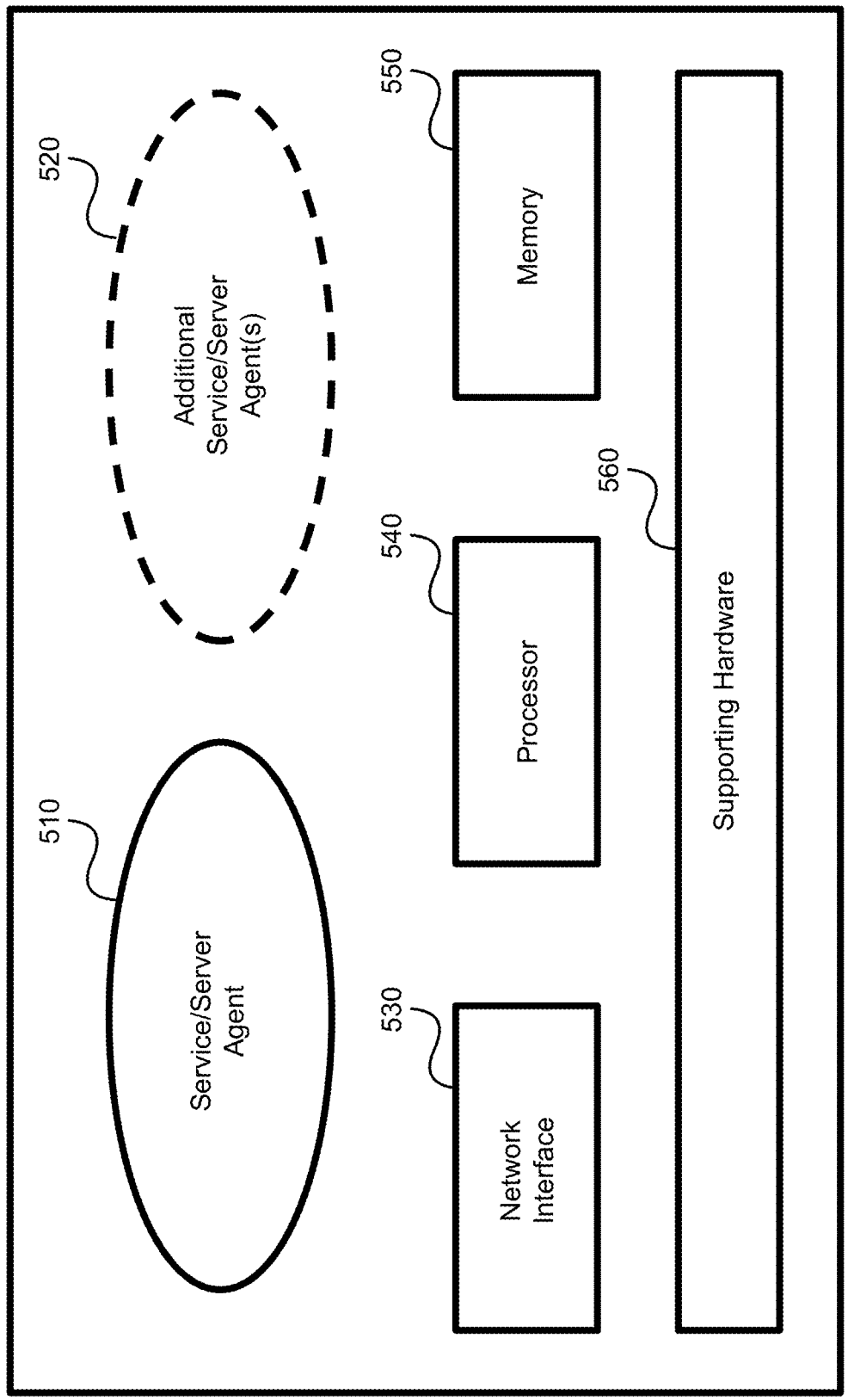
FIG. 5 illustrates a computer apparatus configured to provide at least one service agent or server agent, according to an embodiment of the present invention.

FIG. 5 illustrates a computer apparatus configured to provide at least one service agent or server agent, according to an embodiment of the present invention. Execution of program instructions by the computer apparatus implements at least one service or server agent 510, and potentially one or more additional server or service agents 520. The computer apparatus may be hosted in or outside of a data centre. When multiple agents are hosted on the same apparatus, communication between the agents can be performed via messaging internal to the apparatus.

Figure 6:
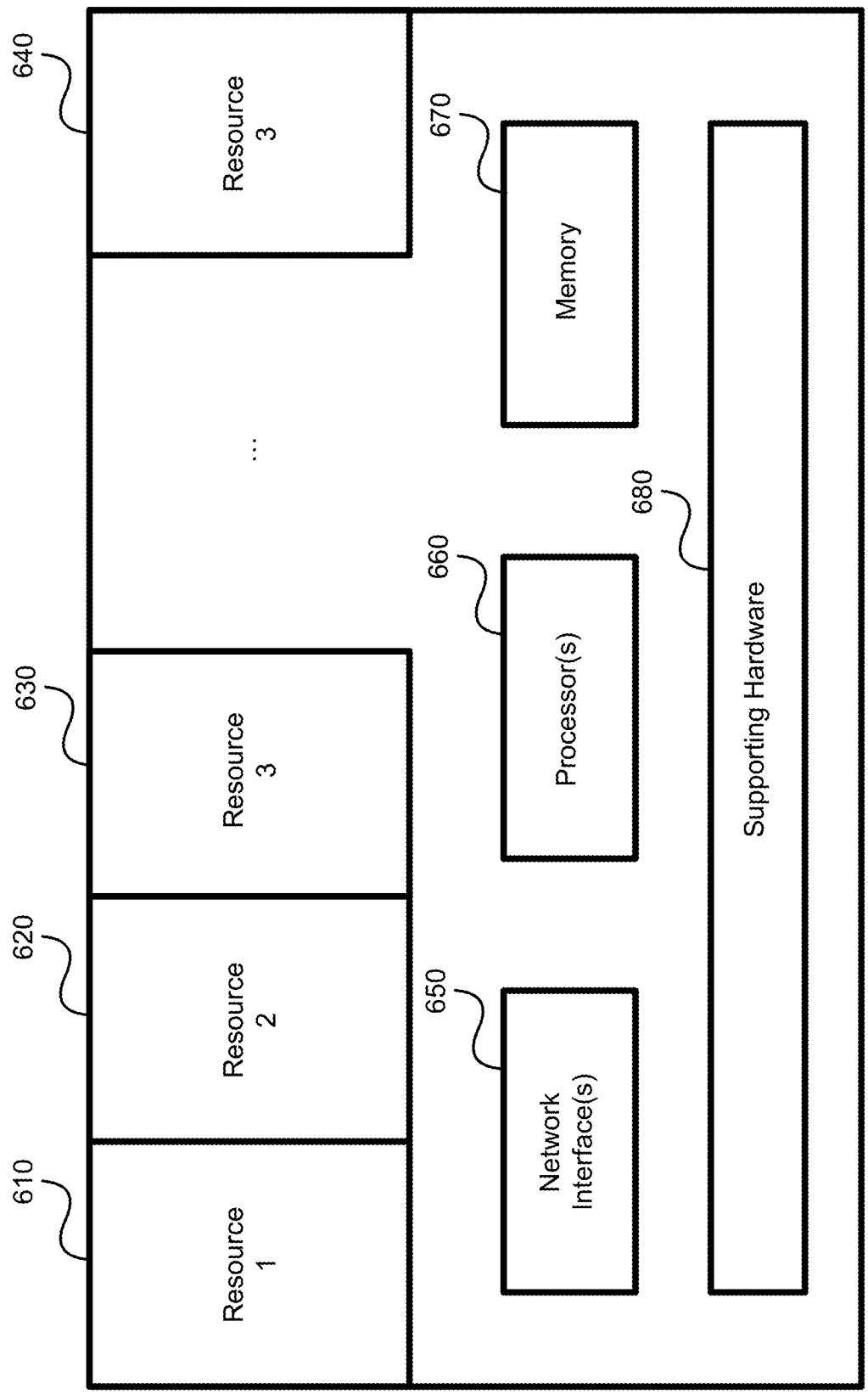
FIG. 6 illustrates a computer apparatus configured as a server, according to an embodiment of the present invention.

FIG. 6 illustrates a computer apparatus configured as a server, according to an embodiment of the present invention. The server agent is not shown but may also be provided by the same apparatus or by another computer apparatus operatively coupled thereto. The apparatus of FIG. 5 can be integrated with the apparatus of FIG. 6. The apparatus of FIG. 6 includes resources which can be physically or logically grouped or partitioned into a plurality of resource units 610, 620, 630, 640 numbered from 1 to S. Each resource unit can be allocated separately to support a specified service. Each resource unit can include one or a combination of resources, such as computer processing resources, network communication resources, and computer memory resources.

The apparatus of both FIGS. 5 and 6 includes one or more computer processors 540, 660, a memory 550, 670, a network interface 530, 650, and supporting hardware 560, 680, such as power supplies, internal communication buses etc. The computer apparatus is coupled to a communication network via the network interface. The processor executes program instructions stored in the memory. The processor may store and retrieve dynamically generated information in the memory, such as current bid or pricing information.

Figure 7:
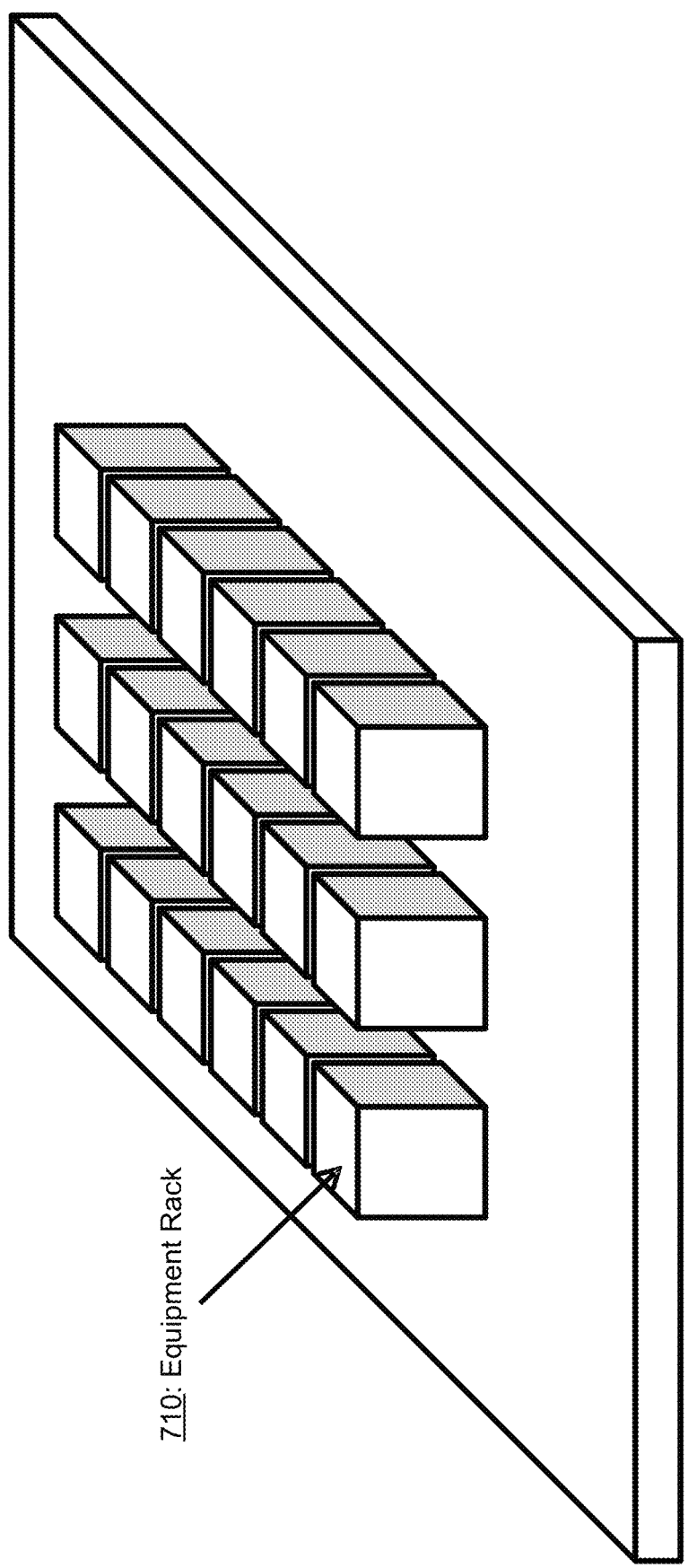
FIG. 7 illustrates a portion of a data centre comprising a plurality of computer apparatuses arranged in server racks.

FIG. 7 illustrates a portion of a data centre comprising a plurality of computer apparatuses arranged in server racks 710. The apparatuses may be used to provide service agents, server agents, server resources, or a combination thereof. The data centre includes a plurality of equipment racks, each of which can include one or a plurality of servers or server components. In some embodiments, the servers can be virtualized and can be dynamically instantiated using resources from one or a plurality of equipment racks.

Performance Evaluation

For purposes of analysis, each service may be considered as attempting to minimize the amount spent on resources, assuming that its requirements are met. That is, the objective of service i may be to minimize the quantity $\Sigma_{j=1}^{J} s_{ij}$. Each service may also have a target resource usage given by $B_i = \Sigma_{j=1}^{J} b_{ij}$. Each service may also have other targets, such as a target number of servers to be used in providing the service, or targets related to the number of physical layer processors supporting the service, or the number of different cloud-based radio access networks supporting the service. Particularly for a congested, i.e. fully utilized data center with potentially overcommitted resources, it may be desirable to provide a proportional fair allocation of resources to different services, weighted by each server's budget. That is, a reasonable system objective is to maximize the utility:

$$U = \Sigma_{i=1}^{N} S_i \log(\Sigma_{j=1}^{J} b_{ij}) \qquad (7)$$

According to Chen et al., "Markov Approximation for Combinatorial Network Optimization," IEEE Trans. Information Theory, Vol. 59, No. 10, October 2013 (hereinafter referred to as Chen), when using a log-sum-exponential function to approximate the optimal value of a combinatorial optimization problem, the solution to the combinatorial optimization problem can be interpreted as the stationary probability distribution of a class of time-reversible Markov chains. Combining the utility function of Equation (7) with the optimal probability distribution expression developed in Chen, namely:

$$p_f^*(x) = \frac{\exp\left(\beta \sum_{r \in R} x_r(f)\right)}{\sum_{f' \in F} \exp\left(\beta \sum_{r \in R} x_r(f')\right)} \quad \forall f \in F,$$

yields the desired Markov chain equilibrium probability distribution:

$$p_f^*(x) = \frac{\exp\left(\beta \sum_{i=1}^{N} S_i \log\left(\sum_{j=1}^{J} b_{ij}\right)\right)}{\sum_{f' \in F} \exp\left(\beta \sum_{i=1}^{N} S_i \log\left(\sum_{j=1}^{J} b_{ij}\right)\right)}. \qquad (8)$$

It can be shown that, with certain conditions, the collective behaviour of services and servers, as set forth previously herein, approximates a continuous-time Markov chain satisfying the above-specified equilibrium probability distribution, which corresponds to the optimal value for the utility function specified in Equation (7). A rationale for this is as follows. As mentioned, Equation (8) gives the Markov chain equilibrium probability distribution corresponding to the optimal value for utility function specified in Equation (7). This equilibrium probability distribution is achieved for a Markov Chain in which the ratio of transition rates from each current state to each other state is of the form:

$$\frac{\exp\left(\beta \sum_{i=1}^{N} S_i \log\left(\sum_{j=1}^{J} b'_{ij}\right)\right)}{\exp\left(\beta \sum_{i=1}^{N} S_i \log\left(\sum_{j=1}^{J} b_{ij}\right)\right)}. \qquad (9)$$

The transition rates and equilibrium probability distribution can be related through the Markov chain detailed balance equations, which hold that for any two states a and b having equilibrium probabilities $p_a$ and $p_b$, the transition rates between these two states are governed by the relationship $p_a q_{ab} = p_b q_{ba}$, where $q_{ab}$ and $q_{ba}$ are the transition rates from states a to b and b to a, respectively.

As set forth previously, $b_{ij}$ and $b_{ij}'$ are server resource allocations for the current state and another state, respectively. The values of $b_{ij}'$ can be estimated for example using the form of Equation (6). Under certain assumptions, Equation (9) can be approximated by or simplified to:

$$\frac{\exp\left(\beta S_i \log\left(\sum_{j=1}^{J} b'_{ij}\right)\right)}{\exp\left(\beta S_i \log\left(\sum_{j=1}^{J} b_{ij}\right)\right)}. \qquad (10)$$

Equation (10) gives a condition on the ratio between transition rates. It can further be shown that Equations (1) and (2) can be used as approximations for Equation (10). Thus, the collective service and server behaviour described previously approximately implements the desired Markov chain.

In various embodiments, local actors, such as service agents, server agents, or both, are indifferent to the feasibility of their actions. In other words, local actors do not necessarily have to consider global feasibility when an action is initiated. Rather, another actor or supervising agent in the system may perform a feasibility decision and allow or disallow an action as appropriate. For example, an infeasible bid change may be rejected by a server or supervisory agent. Infeasible decisions so rejected are blocked from causing a transition in the Markov chain. Because Poisson processes that govern transitions are all mutually independent, an infeasible decision can be rejected by a system element without impacting the aggregate system behaviour.

Examples and Simulations

Figure 8:
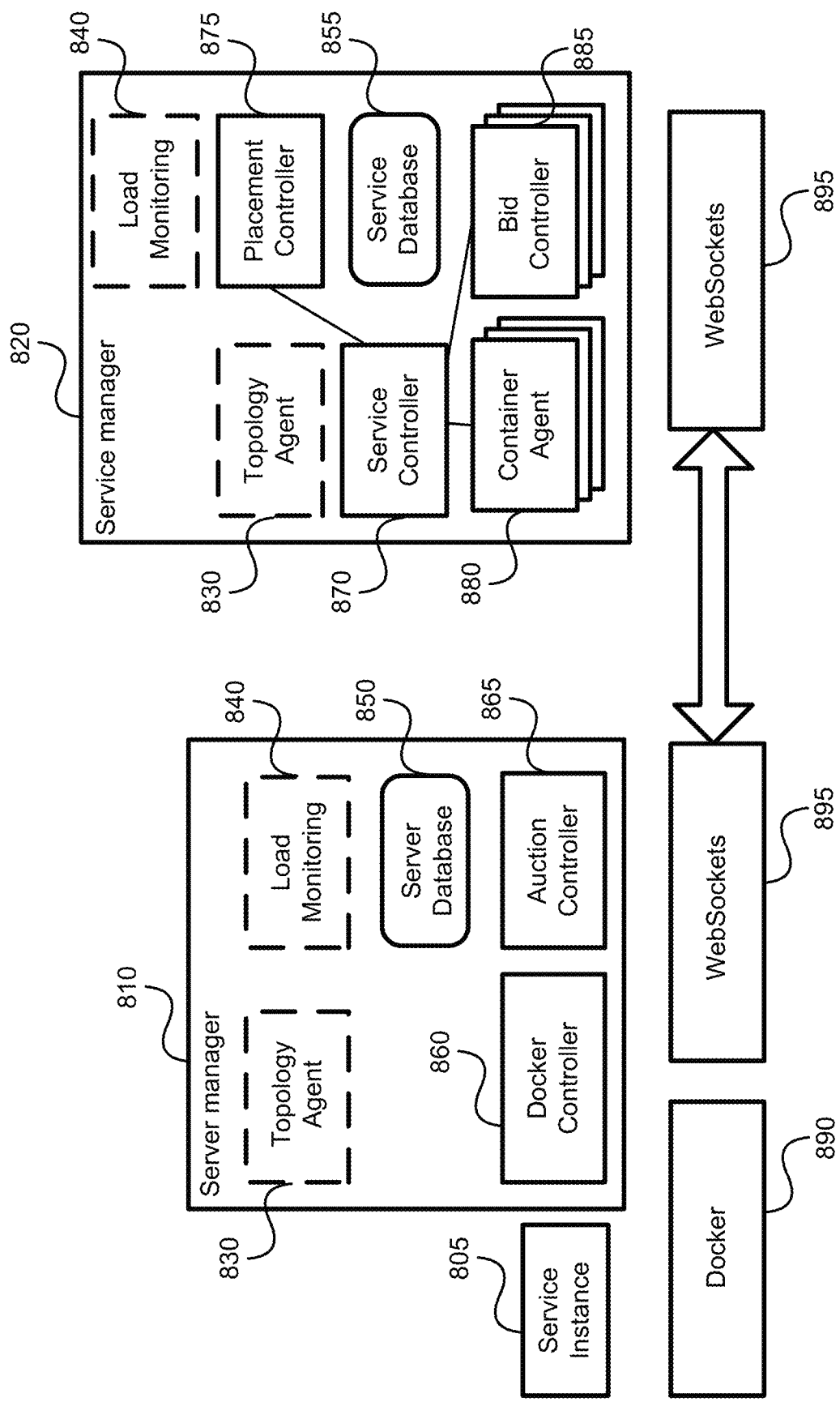
FIG. 8 schematically illustrates a server manager (i.e. server agent) and service manager (i.e. service agent), according to an embodiment of the present invention.

FIG. 8 schematically illustrates a server manager (i.e. server agent) 810 and service manager (i.e. service agent) 820, according to an example embodiment of the present invention. The server manager includes a container (Docker) controller 860 for interacting with a Docker 890 to start, stop, and update containers. The containers may be used to instantiate service instances 805 using related resources. The service instances run as Docker containers. The server manager further includes an auction controller 865 configured to run auctions for resources and set resource prices. The server manager further includes a database 850 configured to keep track of the services running on the server. The database may be operatively coupled to both the auction controller and the container controller. It is noted that, rather than using containers, other embodiments of the present invention may employ a virtualization approach for supporting services using server resources.

The service manager includes a placement controller 875 configured to implement the probabilistic transition dynamics for adjusting bids by the service. The service manager further includes multiple bid controllers 885, each bid controller being configured to participate in a corresponding auction on behalf of the service by interacting with the auction controller 865 of a particular server manager 810. Bid controllers of multiple service managers concurrently interact with the auction controller of a given server manager in a competitive auctioning process. The service manager further includes multiple container agents 880, each configured to interact with a specific Docker controller 860, in order to instantiate and manage service instances on corresponding servers, for example following successful bidding. The service manager 820 further includes a service controller 870 configured to manage the interaction between the other components of the service manager. The service manager further includes a service database 855 configured to track information used by the different components of the service manager.

The server manager, service manager, or both, may further include a topology agent 830 configured to participate in a data centre topology overlay. The data center topology can include servers and their associated resources. The data center topology overlay provides information indicative of the data center topology, for example in absence of a central controller. The server manager, service manager, or both, may further include a load monitoring component 840 configured to track server load(s). The server manager(s) and service manager(s) can communicate via WebSockets 895, for example, or another communication mechanism.

Figure 9:
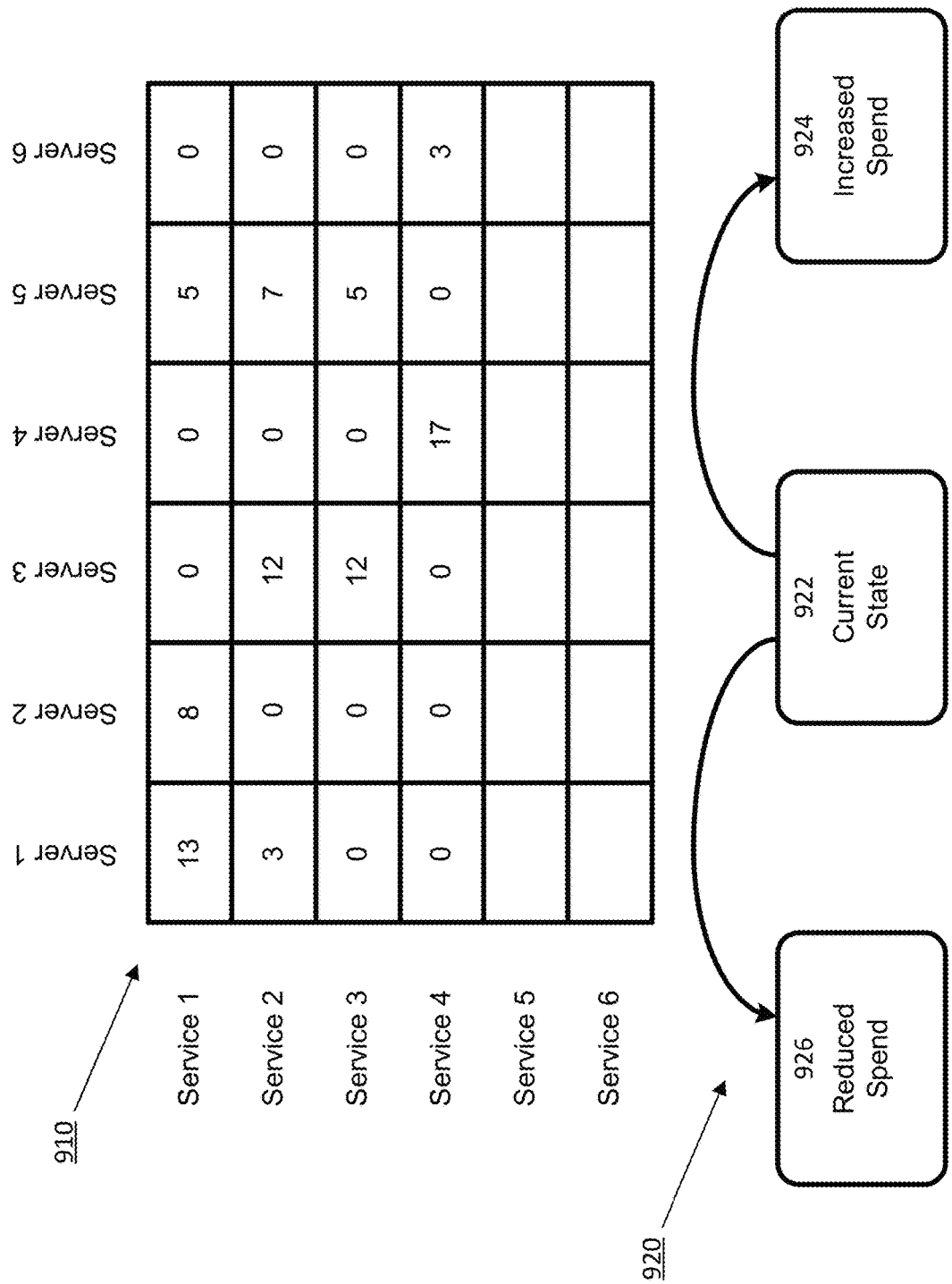
FIG. 9 illustrates an example table showing data center placements, and an example of allowable state transition dynamics by a service agent, according to an embodiment of the present invention.

FIG. 9 illustrates an example table 910 showing data center placements, and an example of allowable state transition dynamics 920 by a service agent. In the example, there are six servers and six service agents. Each entry in the table 910 indicates the amount being bid on each server by each corresponding service. Thus the current states of the services are indicated. (Alternatively, each entry in the table may indicate the amount of resources being allocated by each server to each corresponding service.) Services can update their current states 922 according to the probabilistic transition dynamic, either by increasing 924 their spend (bid amount) on a given server or by reducing 926 their spend on a given server. In some embodiments, the services can only update their spend on one server at a time.

Figure 10:
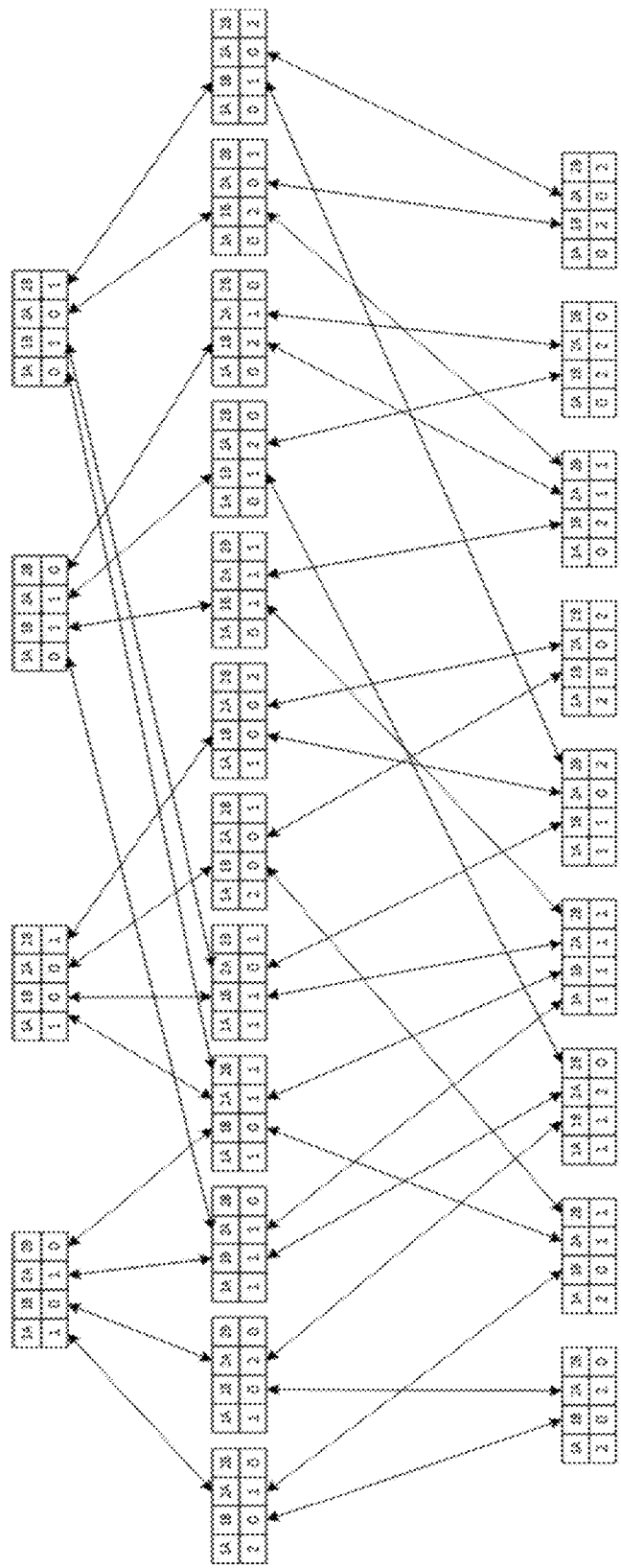
FIG. 10 illustrates a state space for an embodiment in which two service agents bid for resources on two servers, according to an embodiment of the present invention.

FIG. 10 illustrates the possible system states 1010 for a simple example embodiment in which two service agents, labelled Service 1 and Service 2, bid for resources on two servers, labelled Server A and Server B. Each service agent has a budget of two units and each server has two available resources and a reserve resource price of one unit. The possible system states (service bids) along with the possible transitions between system states are shown. The states are shown as vector quantities in which the first through fourth elements are, respectively from left to right: the bid amount by service 1 on server A; the bid amount by service 1 on server B; the bid amount by service 2 on server A; and the bid amount by service 2 on server B. It is noted that the possible state transitions are constrained so that only one service can change a bid amount at only one server at a time.

FIG. 11 illustrates a table 1110 showing the equilibrium, steady-state probabilities for the Markov chain according to an instance of the example embodiment of FIG. 10. As illustrated, the system spends the highest proportion of time in states '0220', '1111', and '2002'.

Figure 12:
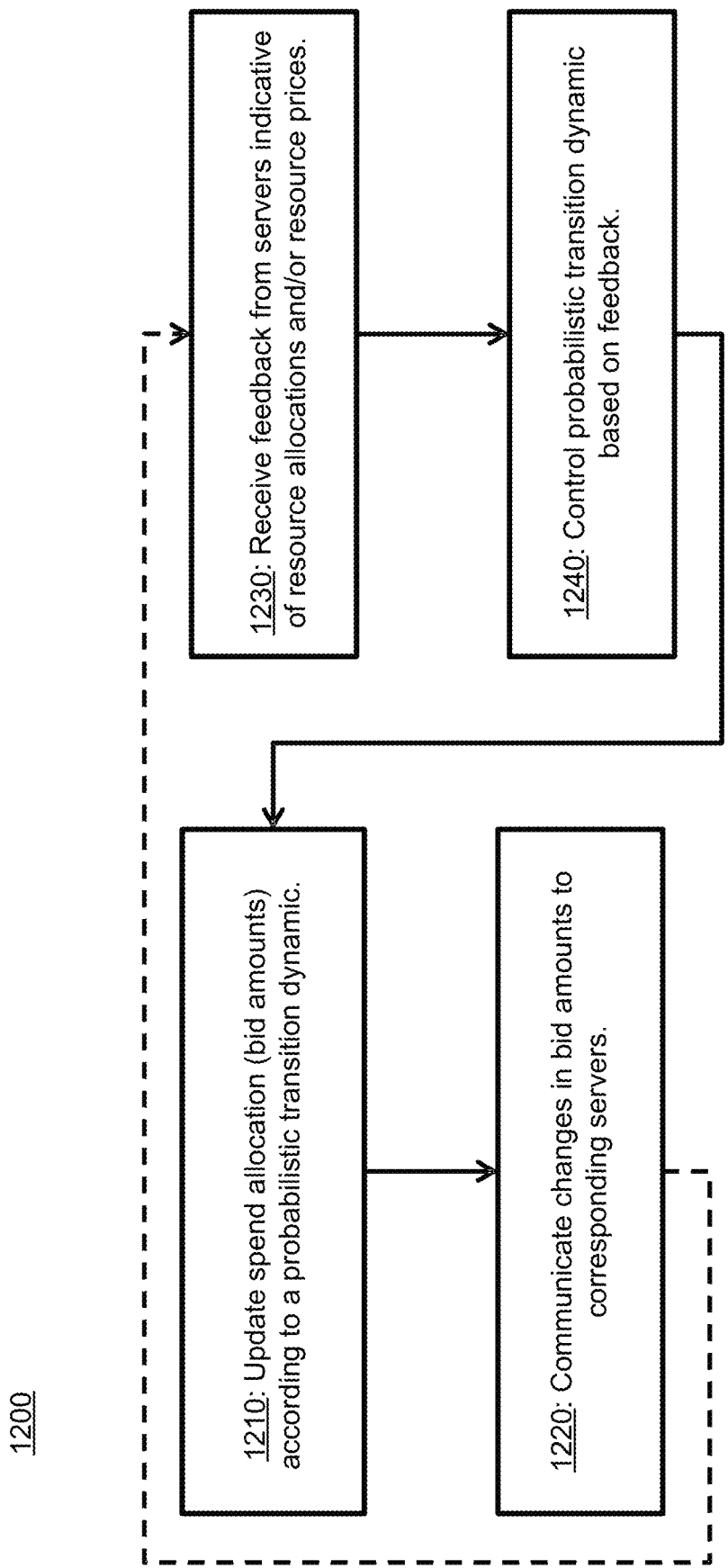
FIG. 12 illustrates a method for obtaining server resources for supporting a service, according to an embodiment of the present invention.

FIG. 12 illustrates a method 1200 for obtaining server resources for supporting a service i. The method includes updating 1210 a spend allocation according to a probabilistic transition dynamic. The spend allocation includes one or more bid amounts $s_{ij}$, each representing a bid for resources on a corresponding one j of one or more servers. The probabilistic transition dynamic can cause the spend allocation to be updated to a randomly selected new spend allocation at a random time. The updates may approximate behaviour of a continuous time Markov chain. The method further includes communicating 1220 one or more changes in the one or more bid amounts $s_{ij}$ to corresponding ones of the one or more servers in response to the updating of the spend allocation. The method further includes receiving 1230 feedback from the one or more servers. The feedback may be indicative of amounts $b_{ij}$ of resources allocated by each respective one j of the one or more servers, said amounts $b_{ij}$ of resources allocated for hosting the service i in response to the spend allocation $s_{ij}$. The feedback may additionally or alternatively be indicative of resource prices set by the servers, which is in turn indicative of the allocated amounts of resources. The feedback may be received after communication 1220 of bid changes or at other times, or a combination thereof. The method further includes controlling 1240 the probabilistic transition dynamic based on the feedback from the one or more servers. Controlling the probabilistic transition dynamic may include keeping up to date the randomization parameters for selecting new spend allocations and transition times, for example so that the randomization parameters satisfy the criteria of Equation (1) or (2). The method illustrated in FIG. 12 may be carried out by a service agent.

Figure 13:
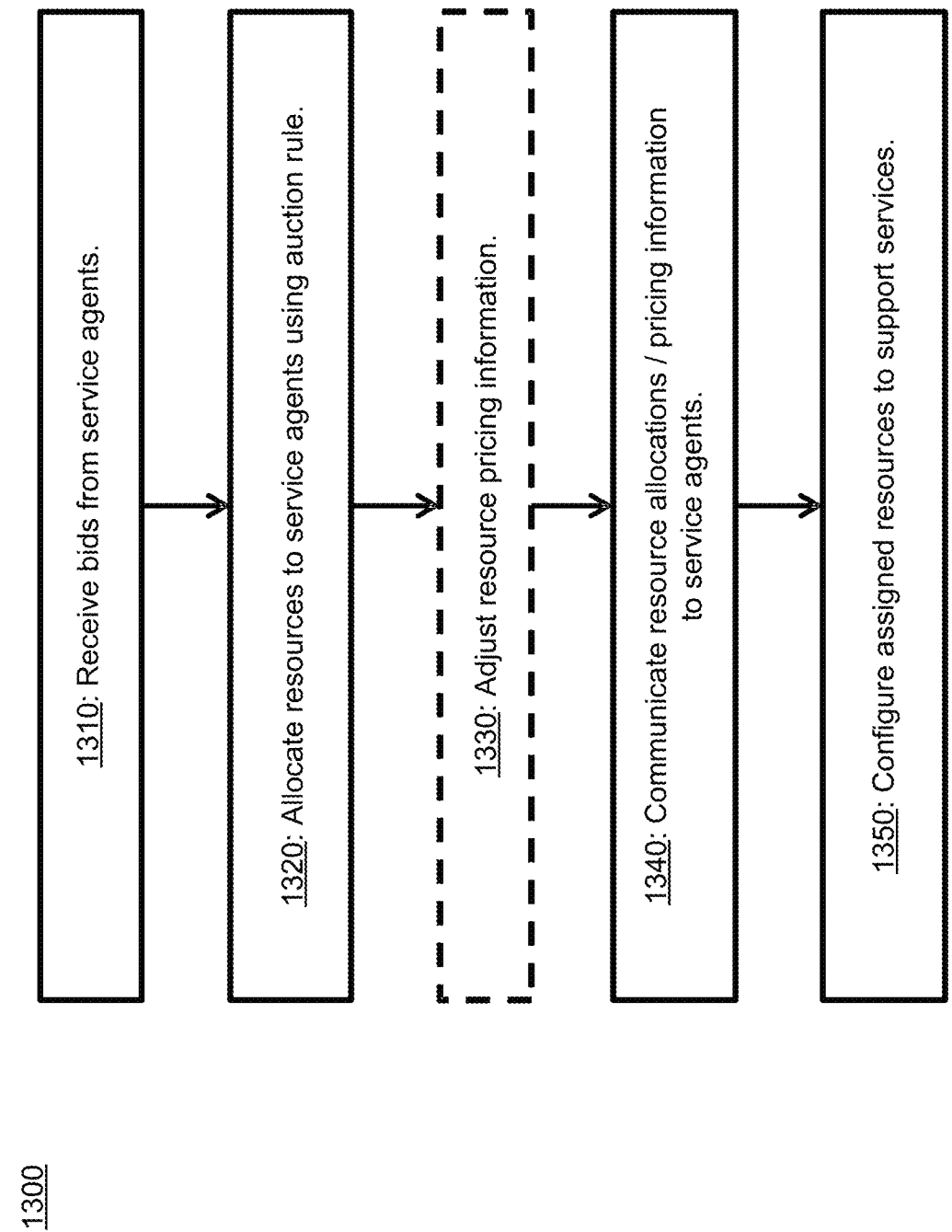
FIG. 13 illustrates a method for operating a server, according to an embodiment of the present invention.

FIG. 13 illustrates a method 1300 for operating a server, according to an embodiment of the present invention. The method includes receiving 1310, from one or more service agents, bids for usage of resources held by the server. The method further includes allocating 1320 resources to the one or more service agents using an auction rule in which an amount of resources assigned to each service is approximately proportional to an amount bid for resources by that service. The method may further include adjusting 1330 resource pricing information based on the current received bids. The auction rule and resource pricing adjustments may be performed according to Equations (3), (4), (5) and (6). The method further includes communicating 1340 indications of the resource allocations, associated pricing information, or both, to the service agents. The communication can be performed asynchronously with the other method steps. The method further includes configuring 1350 the assigned resources to support the corresponding services to which the resources are currently assigned. The method of FIG. 13 may be performed by a server agent or by a functional entity implemented as a software function on a computing platform.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for obtaining server resources for supporting a service i, the method performed by a computer system for managing the service i and comprising repeatedly:
updating a spend allocation according to a probabilistic transition dynamic, the probabilistic transition dynamic comprising randomly or pseudo-randomly updating the spend allocation, the spend allocation comprising one or more bid amounts $s_{ij}$, each representing a bid for resources on a corresponding one j of one or more servers;
communicating one or more changes in the one or more bid amounts $s_{ij}$ to corresponding ones of the one or more servers in response to the updating of the spend allocation;
receiving feedback, from the one or more servers, indicative of amounts $b_{ij}$ of resources allocated by each respective one j of the one or more servers, or indicative of resource prices used by each respective one j of the one or more servers in allocating said amounts $b_{ij}$ of resources, said amounts $b_{ij}$ of resources allocated for hosting the service i in response to the spend allocation $s_{ij}$, and
controlling the probabilistic transition dynamic based on the feedback from the one or more servers,
wherein the probabilistic transition dynamic comprises probabilistically transitioning the spend allocation from a current spend allocation a to a new spend allocation, the new spend allocation belonging to a set of one or more other spend allocations which are different from the spend allocation, wherein:

probabilistic transitioning between the spend allocation a and each member b of the set of one or more other spend allocations occurs according to a respective transition rate $q_{ab}$;
probabilistic transitioning between each member b of the set of one or more other spend allocations and the current spend allocation a occurs according to another respective transition rate $q_{ba}$;
for each member b of the set of one or more other spend allocations, a ratio $q_{ab}/q_{ba}$ between: the transition rate $q_{ab}$ from the current spend allocation a to said member b; and the transition rate $q_{ba}$ from said member b to the current spend allocation a can be determined according to a function which is given by a single value or which is given by multiplying together a plurality of values, each of the single value and the plurality of values being a respective term raised to a predetermined power, the respective term being a fraction having:
a numerator equal to a total anticipated amount, over all of the one or more servers, of resources allocated for hosting one of a plurality of services in response to the other spend allocation corresponding to said member b, said plurality of services including the service i; and
a denominator equal to a total, over all of the one or more servers, of said amounts $b_{ij}$ of resources allocated for hosting said one of the plurality of services in response to the current spend allocation a,
wherein in the case of the single value, said one of the plurality of services is the service i, and wherein in the case of the plurality of values, said one of the plurality of services in each respective term is a different one of the plurality of services.

2. The method of claim 1, wherein the amount $b_{ij}$ of resources at each respective one j of the one or more servers is in a non-decreasing relationship with the element $s_{ij}$ for said respective one j of the one or more servers.

3. The method of claim 1, wherein each of the one or more servers for which said amount $b_{ij}$ of resources is greater than zero hosts the service using at least said amount $b_{ij}$ of resources.

4. The method of claim 1, wherein the feedback is in the form of resource pricing information.

5. The method of claim 1, wherein the resources on each server are assigned using an auction rule in which an amount of resources assigned to each one of a plurality of services, including the service i, is approximately proportional to the amount bid, by said one of the plurality of services, for resources on said server.

6. A method for associating server resources with a plurality of services, the method performed by one or more computer systems for managing the plurality of services and comprising separately performing the method of claim 1 for each of the plurality of services, wherein each of the plurality of services interacts with the same one or more servers.

7. The method of claim 6, further comprising, by each of the one or more servers, assigning resources using an auction rule in which an amount of resources assigned to each one of the plurality of services is approximately proportional to an amount bid by said one of the plurality of services for resources.

8. An apparatus for obtaining server resources for supporting a service i, the apparatus comprising a computer processor, a memory, and a network interface, the computer processor being operatively coupled to the memory and the network interface, and the apparatus configured to repeatedly:

update a spend allocation according to a probabilistic transition dynamic, the probabilistic transition dynamic comprising randomly or pseudo-randomly updating the spend allocation, the spend allocation comprising one or more bid amounts $s_{ij}$, each representing a bid for resources on a corresponding one j of one or more servers;

communicate, using the network interface, one or more changes in the one or more bid amounts $s_{ij}$ to corresponding ones of the one or more servers in response to the updating of the spend allocation;

receive feedback, via the network interface from the one or more servers, indicative of amounts $b_{ij}$ of resources allocated by each respective one j of the one or more servers, or indicative of resource prices used by each respective one j of the one or more servers in allocating said amounts $b_{ij}$ of resources, said amounts $b_{ij}$ of resources allocated for hosting the service i in response to the spend allocation $s_{ij}$; and control the probabilistic transition dynamic based on the feedback from the one or more servers, wherein the probabilistic transition dynamic comprises probabilistically transitioning the spend allocation from a current spend allocation a to a new spend allocation, the new spend allocation belonging to a set of one or more other spend allocations which are different from the spend allocation, wherein:

probabilistic transitioning between the spend allocation a and each member b of the set of one or more other spend allocations occurs according to a respective transition rate $q_{ab}$;

probabilistic transitioning between each member b of the set of one or more other spend allocations and the current spend allocation a occurs according to another respective transition rate $q_{ba}$;

for each member b of the set of one or more other spend allocations, a ratio $q_{ab}/q_{ba}$ between: the transition rate $q_{ab}$ from the current spend allocation a to said member b; and the transition rate $q_{ba}$ from said member b to the current spend allocation a can be determined according to a function which is given by a single value or which is given by multiplying together a plurality of values, each of the single value and the plurality of values being a respective term raised to a predetermined power, the respective term being a fraction having:

a numerator equal to a total anticipated amount, over all of the one or more servers, of resources allocated for hosting one of a plurality of services in response to the other spend allocation corresponding to said member b, said plurality of services including the service i; and a denominator equal to a total, over all of the one or more servers, of said amounts $b_{ij}$ of resources allocated for hosting said one of the plurality of services in response to the current spend allocation a, wherein in the case of the single value, said one of the plurality of services is the service i, and wherein in the case of the plurality of values, said one of the plurality of services in each respective term is a different one of the plurality of services.

9. The apparatus of claim 8, wherein the amount $b_{ij}$ of resources at each respective one j of the one or more servers is in a non-decreasing relationship with the element $s_{ij}$ for said respective one j of the one or more servers.

10. The apparatus of claim 8, wherein each of the one or more servers for which said amount $b_{ij}$ of resources is greater than zero hosts the service using at least said amount $b_{ij}$ of resources.

11. The apparatus of claim 8, wherein the feedback is in the form of resource pricing information.

12. The apparatus of claim 8, wherein the resources on each server are assigned using an auction rule in which an amount of resources assigned to each one of a plurality of services, including the service i, is approximately proportional to the amount bid, by said one of the plurality of services, for resources on said server.

13. A system for associating server resources with a plurality of services, the system comprising a plurality of apparatuses according to claim 8, each of the plurality of apparatuses configured to support a different set of one or more of the plurality of services.

14. The method of claim 1, wherein randomly or pseudo-randomly updating the spend allocation is performed according to a Poisson process.

15. The method of claim 1, wherein randomly or pseudo-randomly updating the spend allocation is performed based on a random or pseudo-random process which depends on a current value of the spend allocation and is substantially independent of prior values of the spend allocation.

16. The method of claim 1, wherein the probabilistic transition dynamic corresponds to a Markov chain, a continuous time Markov chain or a discrete time Markov chain approximation of the continuous time Markov chain.

17. The apparatus of claim 8, wherein randomly or pseudo-randomly updating the spend allocation is performed according to a Poisson process.

18. The apparatus of claim 8, wherein randomly or pseudo-randomly updating the spend allocation is performed based on a random or pseudo-random process which depends on a current value of the spend allocation and is substantially independent of prior values of the spend allocation.

19. The apparatus of claim 8, wherein the probabilistic transition dynamic corresponds to a Markov chain, a continuous time Markov chain or a discrete time Markov chain approximation of the continuous time Markov chain.

* * * * *